US012623467B2

(12) United States Patent
Aritaki et al.

(10) Patent No.: US 12,623,467 B2
(45) Date of Patent: May 12, 2026

(54) THERMAL PRINT HEAD

(71) Applicant: ROHM CO., LTD., Kyoto (JP)

(72) Inventors: Yasuyuki Aritaki, Kyoto (JP); Toshio Watanabe, Kyoto (JP); Kazuya Nakakubo, Kyoto (JP); Takamichi Otani, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 160 days.

(21) Appl. No.: 18/444,063

(22) Filed: Feb. 16, 2024

(65) Prior Publication Data

US 2024/0286416 A1 Aug. 29, 2024

(30) Foreign Application Priority Data

Feb. 24, 2023 (JP) ................................ 2023-026920

(51) Int. Cl.
*B41J 2/335* (2006.01)

(52) U.S. Cl.
CPC ........... *B41J 2/3351* (2013.01); *B41J 2/3355* (2013.01); *B41J 2/33515* (2013.01)

(58) Field of Classification Search
CPC .... B41J 2/3351; B41J 2/33515; B41J 2/3353; B41J 2/3354; B41J 2/3355; B41J 2/3357
See application file for complete search history.

(56) References Cited

U.S. PATENT DOCUMENTS

| | | | | |
|---|---|---|---|---|
| 8,446,442 B2 * | 5/2013 | Yamamoto | ............. | B41J 2/3354 347/200 |
| 2016/0332456 A1 * | 11/2016 | Daicho | ................ | B41J 2/33545 |
| 2023/0182482 A1 * | 6/2023 | Nakatani | ................ | B41J 2/3354 347/58 |

FOREIGN PATENT DOCUMENTS

JP 2019098667 A 6/2019

* cited by examiner

*Primary Examiner* — Anh T Vo
(74) *Attorney, Agent, or Firm* — HSML P.C.

(57) ABSTRACT

The present disclosure provides a thermal print head. The thermal print head includes: a substrate; a glaze layer, disposed on the substrate; and a wiring layer, disposed on the glaze layer. The wiring layer includes a plurality of bonding pads. The plurality of bonding pads are divided into a plurality of groups. Each of the plurality of groups includes a first bonding pad, a second bonding pad, a third bonding pad and a fourth bonding pad. A first group of the plurality of groups is adjacent to a second group of the plurality of groups along a first direction. The second bonding pad of the first group is located between a center of the first bonding pad of the first group and a center of the third bonding pad of the first group along the first direction.

7 Claims, 7 Drawing Sheets

THERMAL PRINT HEAD

TECHNICAL FIELD

The present disclosure relates to a thermal print head.

BACKGROUND

For example, the Japanese Patent Publication No. 2019-98667 (patent publication 1) discloses a thermal print head. The thermal print head disclosed in patent document 1 includes a substrate, a glaze layer and a wiring layer. The glaze layer is disposed on the substrate. The wiring layer is disposed on the glaze layer.

The wiring layer includes a plurality of first bonding pads and a plurality of second bonding pads. The plurality of first bonding pads are arranged along a first direction to form one row. The plurality of second bonding pads are arranged along the first direction to form one row. The row of the first bonding pads is located on a position shifted from the row of the second bonding pads in a second direction. The second direction is a direction perpendicular to the first direction. A lead wiring portion extends from the first bonding pads and the second bonding pads along the second direction.

PRIOR ART DOCUMENT

Patent Publication

[Patent document 1] Japan Patent Publication No. 2019-98667

DETAILED DESCRIPTION OF THE EMBODIMENTS

Details of the embodiments of the present disclosure are given with the accompanying drawings below. The same or equivalent parts are denoted by the same numerals or symbols in the accompanying drawings below, and the repeated description is omitted. A thermal print head of the embodiment is set to configured to be a thermal print head 100.

(Configuration of Thermal Print Head 100)

The configuration of the thermal print head 100 is described below.

Figure 1:
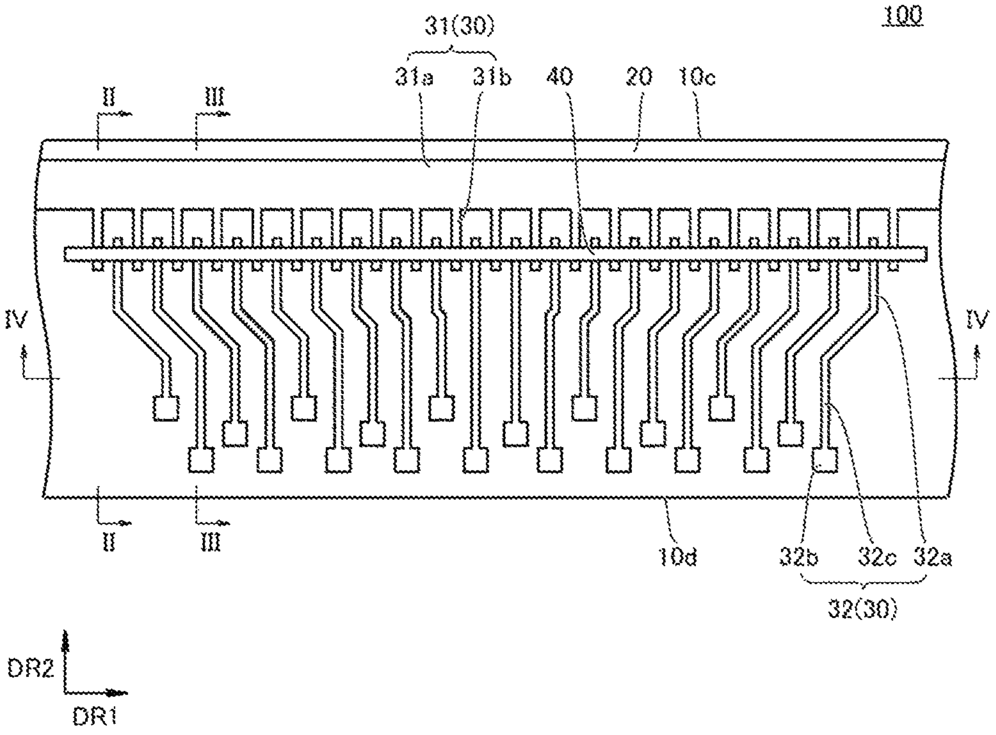
FIG. 1 is a cross-sectional view of a thermal print head 100.
Figure 2:
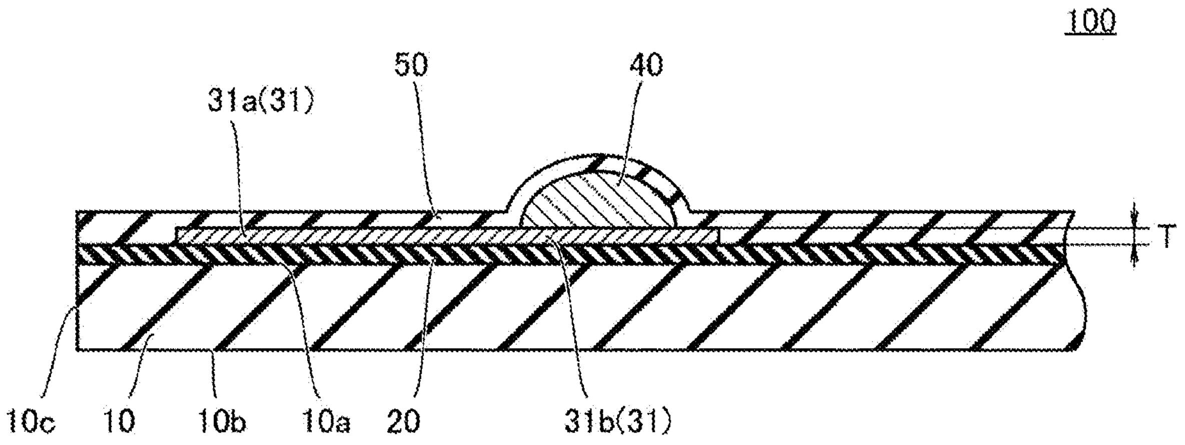
FIG. 2 is a cross-sectional view along a section line II-II in FIG. 1.
Figure 3:
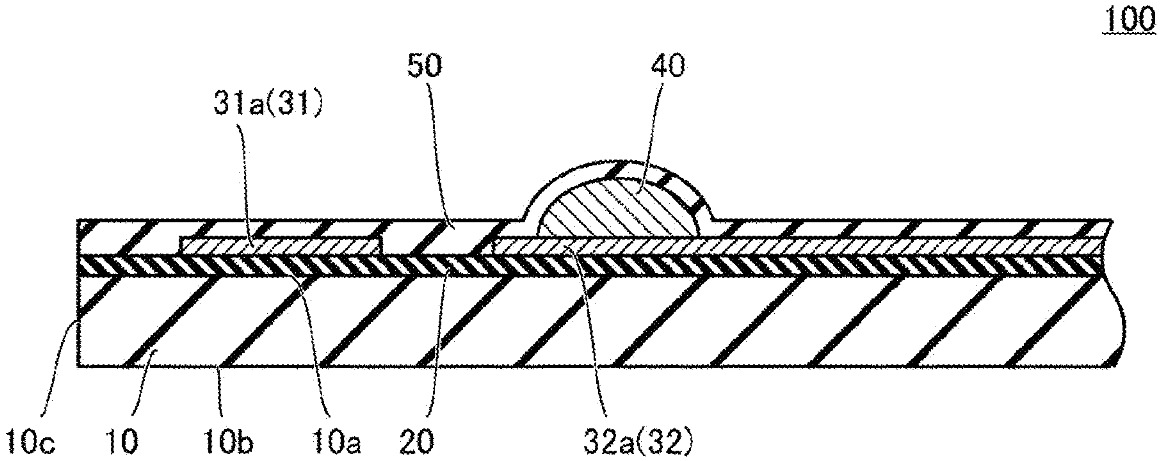
FIG. 3 is a cross-sectional view along a section line III-III in FIG. 1.
Figure 4:
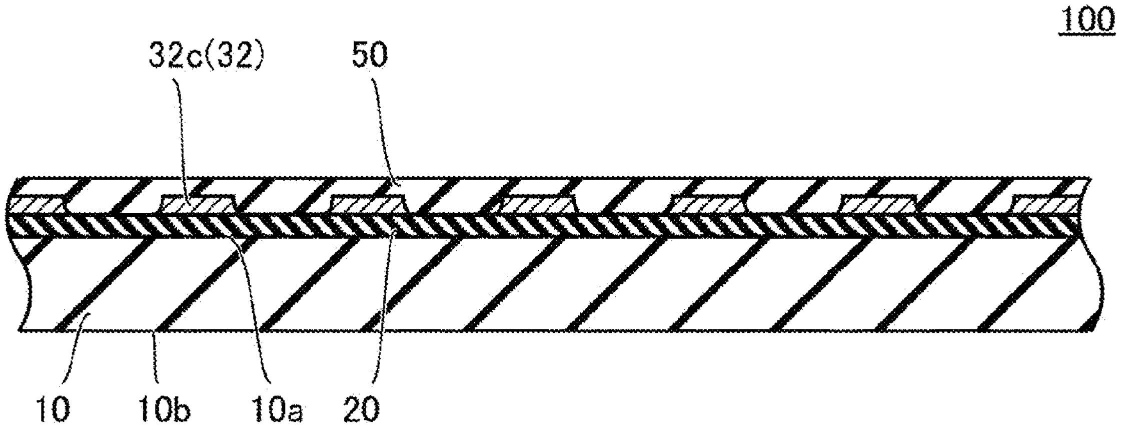
FIG. 4 is a cross-sectional view along a section line IV-IV in FIG. 1.
Figure 5:
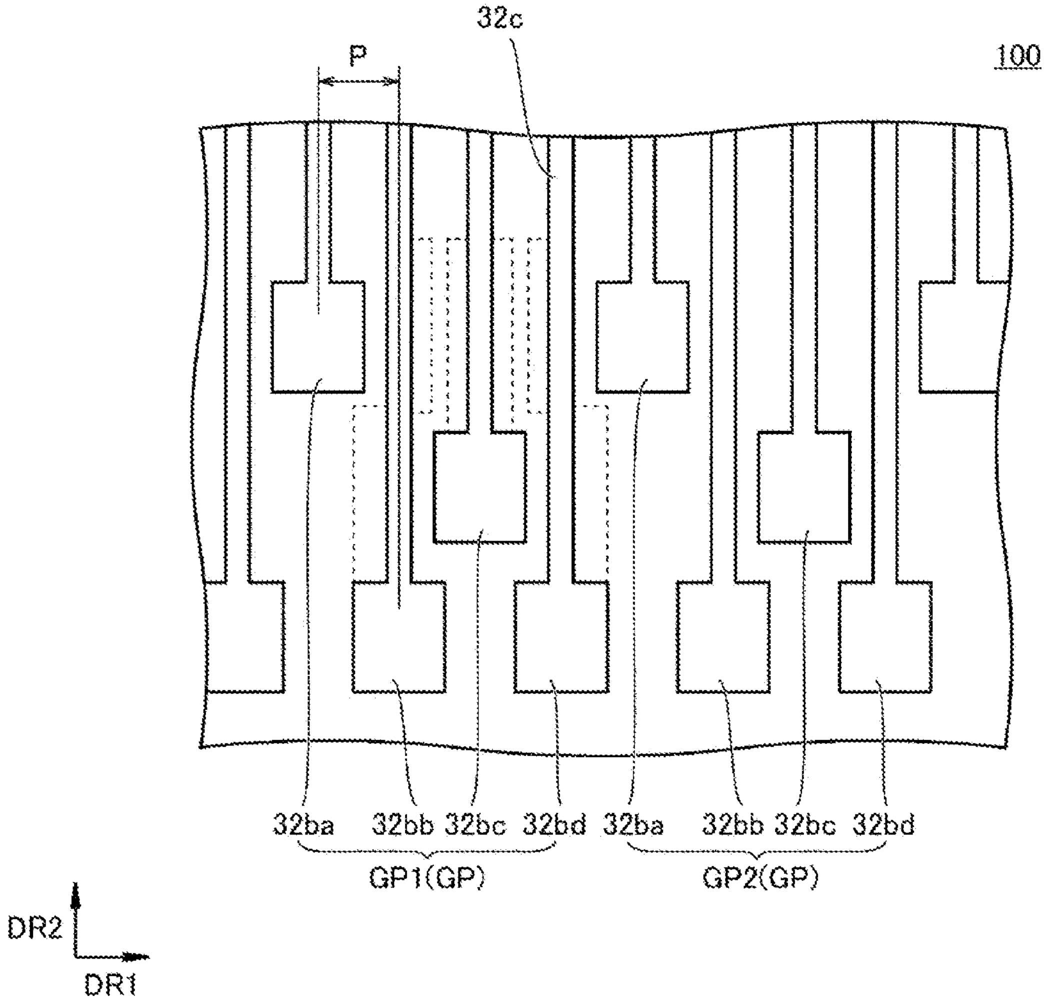
FIG. 5 is an enlarged partial view of FIG. 1.

FIG. 1 shows a cross-sectional view of the thermal print head 100. In FIG. 1, the drawing of a protection glass 50 is omitted. FIG. 2 shows a cross-sectional view along a section line II-II in FIG. 1. FIG. 3 shows a cross-sectional view along a section line III-III in FIG. 1. FIG. 4 shows a cross-sectional view along a section line IV-IV in FIG. 1. FIG. 5 shows an enlarged partial view of FIG. 1. As shown in FIG. 1 to FIG. 5, the thermal print head 100 includes a substrate 10, a glaze layer 20, a wiring layer 30, a heat generator 40 and a protection glass 50.

The substrate 10 has a first main surface 10*a* and a second main surface 10*b*. The first main surface 10*a* and the second main surface 10*b* are end surfaces of the substrate 10 in the thickness direction. The second main surface 10*b* is a surface opposite to the first main surface 10*a*. In a plan view (observed from the side of the first main surface 10*a* along a normal direction of the first main surface 10*a*), a length-wise direction of the substrate 10 is set as a first direction DR1. A direction perpendicular to the first direction DR1 in the plan view is set as a second direction DR2. Two ends of the substrate 10 in the second direction DR2 are respectively set as a first end 10*c* and a second end 10*d*.

The substrate 10 is formed of an insulating material. The substrate 10 is formed of, for example, ceramic. A material forming the substrate 10 is specifically, for example, aluminum oxide ($Al_2O_3$).

The glaze layer 20 is disposed on the substrate 10. More specifically, the glaze layer 20 is disposed on the first main surface 10*a*. The glaze layer 20 is formed of an insulating material. A material forming the glaze layer 20 is specifically, for example, glass.

The wiring layer 30 is disposed on the glaze layer 20. The wiring layer 30 includes a common electrode 31 and a plurality of individual electrodes 32.

The common electrode 31 includes a body 31*a* and a plurality of protrusions 31*b*. The body 31*a* extends along the first direction DR1. The body 31*a* is located on the side of the first end 10*c* in the second direction DR2. That is to say, a distance between the first end 10*c* and the body 31*a* in the second direction DR2 is less than a distance between the second end 10*d* and the body 31*a* in the second direction DR2.

The protrusions 31*b* protrude from an edge of the body 31*a* facing the side of the second end 10*d* along the second direction DR2. The plurality of protrusions 31*b* are arranged at intervals along the first direction DR1.

Each of the individual electrodes 32 includes a front end 32*a* on one end portion and a bonding pad 32*b* on the other end portion. The front end 32*a* is disposed between two adjacent protrusions 31*b*. That is to say, the protrusions 31*b* and the front ends 32*a* are alternately arranged in the first direction DR1. The front end 32*a* extends along the second direction DR2.

The plurality of bonding pads 32*b* are divided into a plurality of groups GP. Each GP includes a first bonding pad 32*ba*, a second bonding pad 32*bb*, a third bonding pad 32*bc* and a fourth bonding pad 32*bd*. A first group of the plurality of groups GP is set as a first group GP1. Another group of the plurality of groups GP that is adjacent to the first group GP1 in the first direction DR1 is set as a second group GP2.

The second bonding pad 32*bb* of the first group GP1 is located between a center of the first bonding pad 32*ba* of the first group GP1 and a center of the third bonding pad 32*bc* of the first group GP1 along the first direction DR1. The fourth bonding pad 32*bd* of the first group GP1 is located between the center of the third bonding pad 32*bc* of the first group GP1 and a center of the first bonding pad 32*ba* of the second group GP2 along the first direction DR1. From another perspective, the first bonding pad 32*ba*, the second bonding pad 32*bb*, the third bonding pad 32*bc* and the fourth bonding pad 32*bd* are sequentially arranged along the first direction DR1.

The third bonding pad 32*bc* is disposed between the first bonding pad 32*ba* and the fourth bonding pad 32*bd* and also between the second bonding pad 32*bb* and the fourth bonding pad 32*bd* in the second direction DR2. From another perspective, the plurality of first bonding pads 32*ba* are arranged to form one row (a first row) along the first direction DR1, the plurality of third bonding pads 32*bc* are arranged to form one row (a second row) along the first direction DR1, and the plurality of second bonding pads 32*bb* and the plurality of fourth bonding pads 32*bd* are arranged to form one row (a third row) along the first direction DR1. Moreover, the first row, the second row and the third row are arranged on positions shifted from one another in the second direction DR2.

The front end 32*a* and the bonding pad 32*b* are connected by a lead wiring portion 32*c*. The part of the lead wiring portion 32*c* connected to the bonding pad 32*b* extends from the bonding pad 32*b* along the second direction DR2.

A pitch P between two adjacent bonding pads 32*b* is set as a pitch P. The pitch P is a distance between a center of one bonding pad 32*b* in the first direction DR1 and a center of another bonding pad 32*b* adjacent to the one bonding pad 32*b* in the first direction DR1. The pitch P is preferably less than about 70 μm. The pitch P can also be less than about 60 μm. The pitch P is, for example, more than about 30 μm.

A thickness of the wiring layer 30 is set as a thickness T. The thickness T is preferably more than about 3 μm. The thickness T can also be more than about 4 μm. The thickness T is, for example, less than about 10 μm. The wiring layer 30 is formed of, for example, a material including silver (Ag). A material forming the wiring layer 30 is specifically, for example, a sintered body of silver particles. The material forming the wiring layer 30 can include copper (Cu) or can include gold (Au).

The heat generator 40 extends long the first direction DR1. The heat generator 40 is disposed on the glaze layer 20 while overlapping the protrusion 31*b* and the front end 32*a*. The heat generator 40 includes, for example, glass, and a plurality of conductive particles blended into the glass. The conductive particles are formed of, for example, ruthenium oxide ($RuO_2$).

A common potential (for example, a ground potential) is applied to the common electrode 31. Although not shown, the bonding pad 32*b* is electrically connected to an external terminal (a bonding pad) of a driver integrated circuit (IC) by a bonding wire. Thus, a potential is selectively applied to each of the plurality of individual electrodes 32 by the driver IC. Thus, a current flow through the part of generator 40 between the front end 32*a* of the independent electrode 32 applied with the potential and the adjacent protrusion 31*b*, and the part resistively generates heat. Printing on paper is performed by transferring to the heat to the paper.

The protection glass 50 is disposed on the glaze layer 20 to cover the wiring layer 30 and the heat generator 40. Although not shown, the protection glass 50 has an opening portion, and the bonding pad 32*b* is exposed from the opening portion.

(Method for Manufacturing Thermal Print Head 100)

The method for manufacturing the thermal print head 100 is described below.

Figure 6:
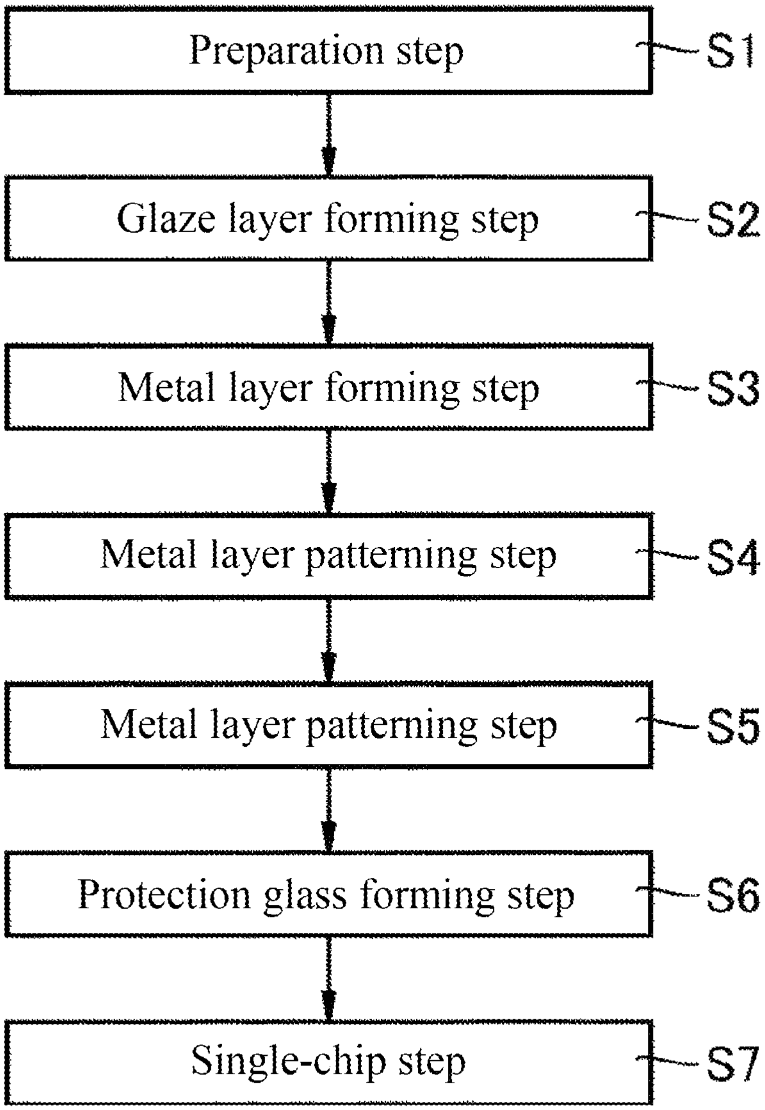
FIG. 6 is manufacturing steps of the thermal print head 100.

FIG. 6 shows manufacturing steps of the thermal print head 100. As shown in FIG. 6, the method for manufacturing the thermal print head 100 includes preparation step S1, glaze layer forming step S2, metal layer forming step S3, metal layer patterning step S4, heat generator forming step S5, protection glass forming step S6, and single-chip step S7.

Figure 7:
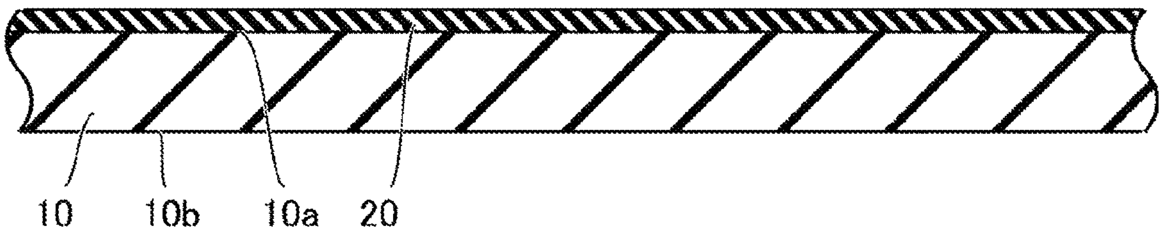
FIG. 7 is a cross-sectional view of glaze layer forming step S2.

In the preparation step S1, the substrate 10 is prepared. The glaze layer forming step S2 is performed after the preparation step S1. FIG. 7 shows a cross-sectional view of the glaze layer forming step S2. As shown in FIG. 7, in the glaze layer forming step S2, the glaze layer 20 is formed on the substrate 10 (the first main surface 10*a*). In the glaze layer forming step S2, first of all, a paste containing glass is applied on the first main surface 10*a*. Secondly, the paste applied is heated. Thus, the glaze layer 20 is formed by evaporation of a solvent in the paste and coupling of the glass in the paste.

Figure 8:
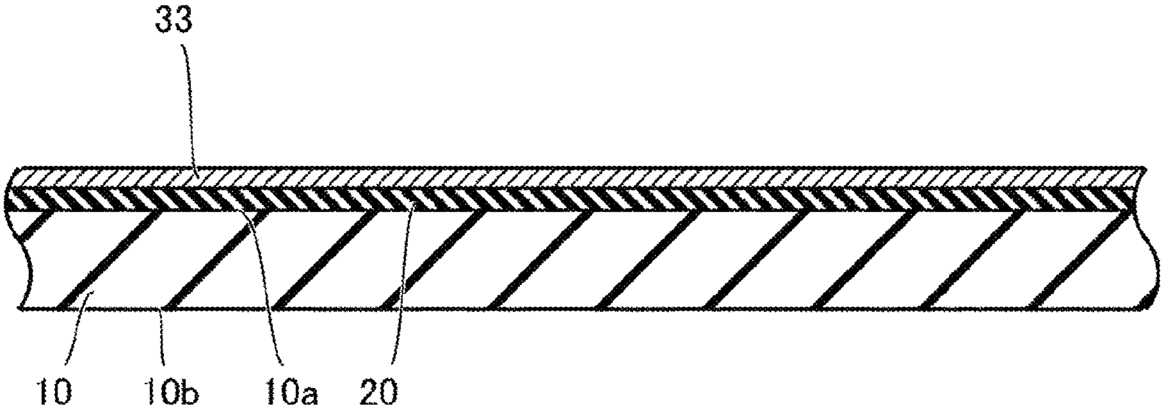
FIG. 8 is a cross-sectional view of metal layer forming step S3.

The metal layer forming step S3 is performed after the glaze layer forming step S2. FIG. 8 shows a cross-sectional view of the metal layer forming step S3. As shown in FIG. 8, in the metal layer forming step S3, a metal layer 33 is formed on the glaze lay 20. The metal layer 33 is formed by applying a paste containing a material (for example, silver particles) forming the metal layer 33 on the glaze layer 20 and sintering the paste.

Figure 9:
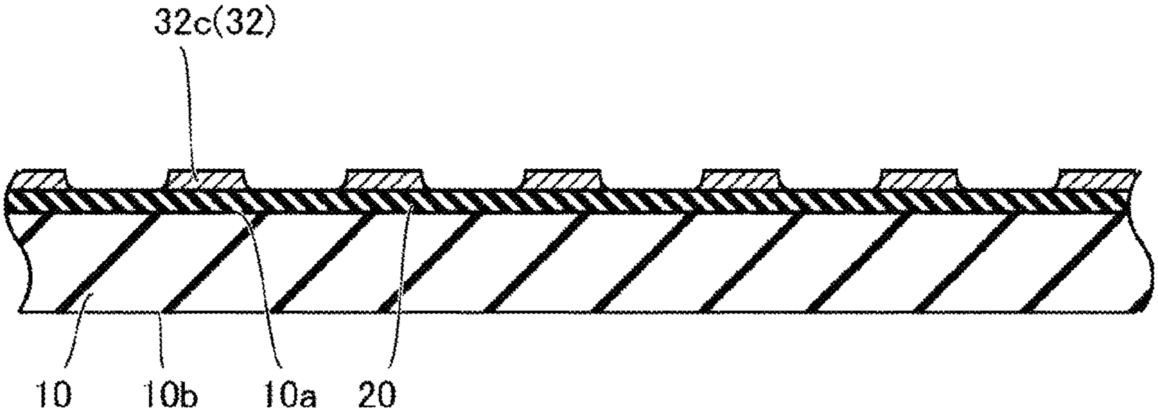
FIG. 9 is a cross-sectional view of metal layer patterning step S4.

The metal layer patterning step S4 is performed after the metal layer forming step S3. FIG. 9 shows a cross-sectional view of the metal layer patterning step S4. As shown in FIG. 9, in the metal layer patterning step S4, the metal layer 33 is patterned and becomes the wiring layer 30. In the metal layer patterning step S4, first of all, a resist pattern is formed on the metal layer 33. The resist pattern is formed by applying a photosensitive resin material on the metal layer 33, and exposing and developing the applied photosensitive resin material. The resist pattern includes an opening portion, and the metal layer 33 is exposed from the opening portion. Secondly, the resist pattern is used as a mask to perform wet etching on the part of the metal layer 33 exposed from the resist pattern. Accordingly, the metal layer 33 is patterned and becomes the wiring layer 30.

Figure 10:
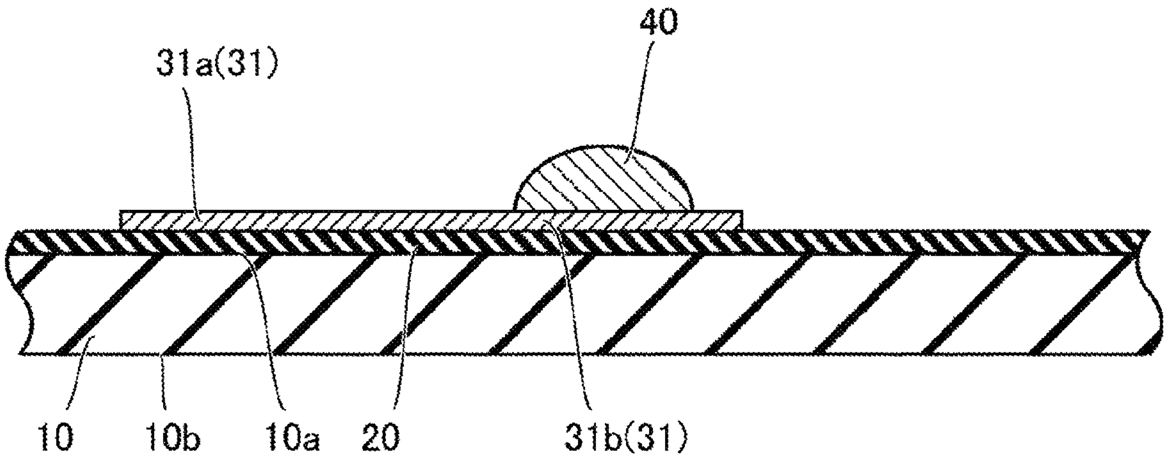
FIG. 10 is a cross-sectional view of heat generator forming step S5.

The heat generator forming step S5 is performed after the metal layer patterning step S4. FIG. 10 shows a cross-sectional view of the heat generator forming step S5. As shown in FIG. 10, in the heat generator forming step S5, the heat generator 40 formed on the glaze layer 20 while overlapping the protrusion 31*b* and the front end 32*a*. The heat generator 40 is formed by applying a paste containing a material (for example, glass and $RuO_2$ particles) forming the heat generator 40 on the glaze layer 20 to overlap the protrusion 32*b* and the front end 32*a* and sintering the paste.

Figure 11:
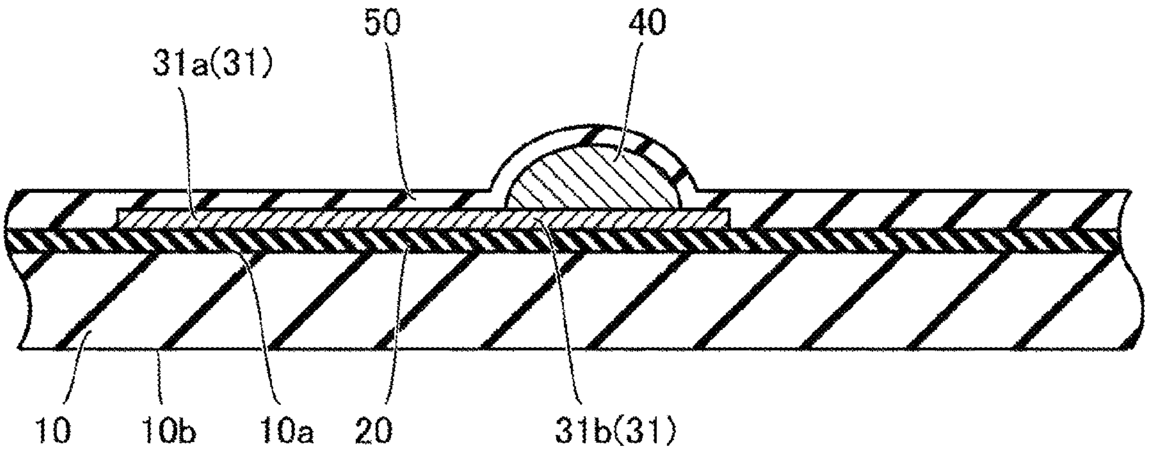
FIG. 11 is a cross-sectional view of protection glass forming step S6.

The protection glass forming step S6 is performed after the heat generator forming step S5. FIG. 11 shows a cross-sectional view of the protection glass forming step S6. As shown in FIG. 11, in the protection glass forming step S6, the protection glass 50 is formed on the glaze layer 20 to cover the wiring layer 30 and the heat generator 40. The protection glass 50 is formed by applying a paste containing glass on the glaze layer 20 to cover the wiring layer 30 and the heat generator 40 and sintering the paste.

The single-chip step S7 is performed after the protection glass forming step S6. In the single-chip step S7, single-chip is performed by irradiating with such as laser to cut the substrate 10, the glaze layer 20 and the protection glass 50 to form a plurality of thermal print heads 100. With the above, the thermal print head 100 having the structure shown in FIG. 1 to FIG. 5 can be obtained.

(Effects of Thermal Print Head 100)

Compared to a thermal print head of a comparison example, the effects of the thermal print head 100 are described below. The thermal print head of the comparison example is set as a thermal print head 100A.

Figure 12:
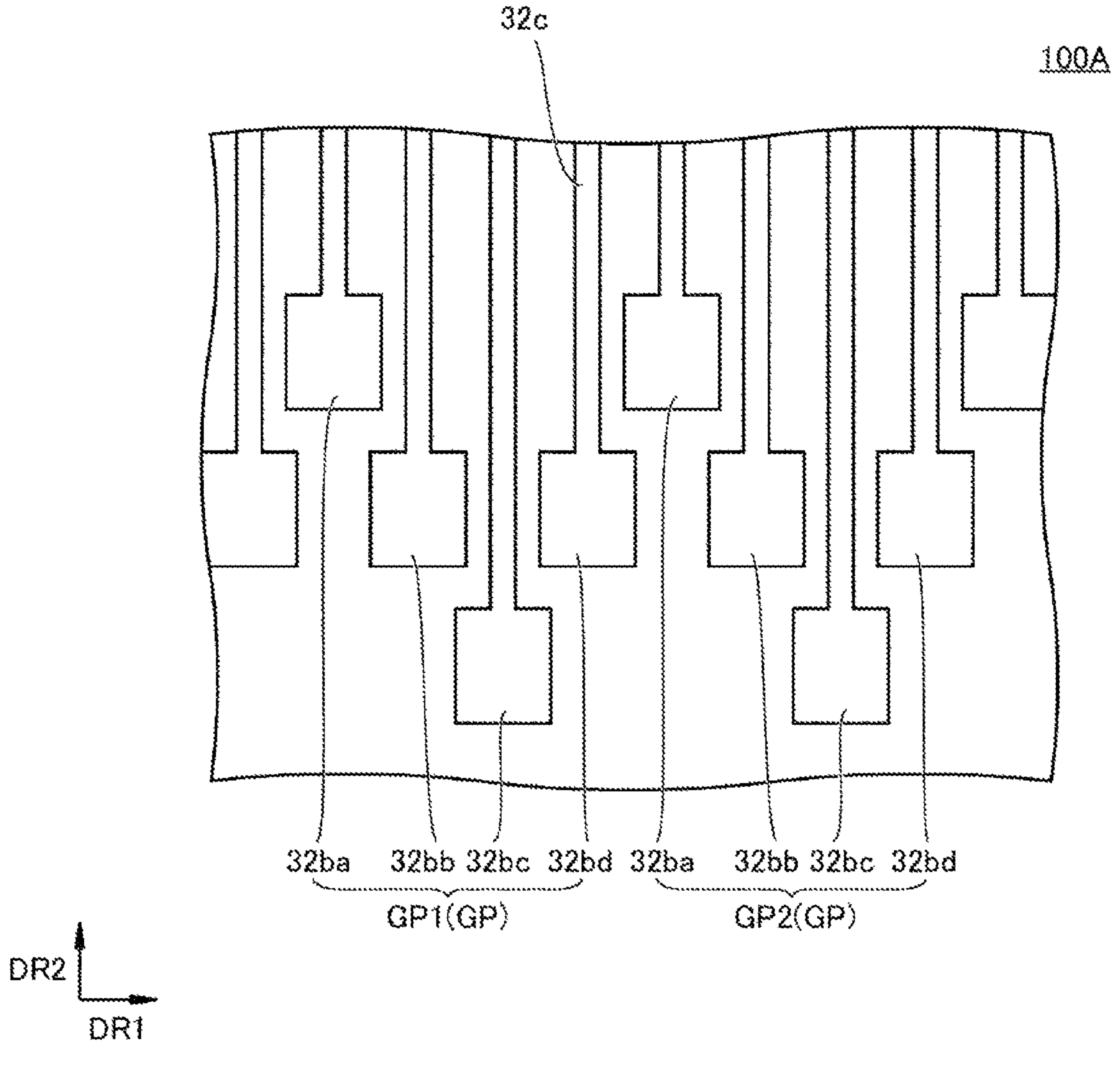
FIG. 12 is an enlarged plan view of a thermal print head 100A.

FIG. 12 shows an enlarged plan view of the thermal print head 100A. As shown in FIG. 12, in the thermal print head 100A, the second bonding pad 32*bb* and the fourth bonding pad 32*bd* are disposed between the first bonding pad 32*ba* and the third bonding pad 32*bc* in the second direction DR2. Apart from the above, the configuration of the thermal print head 100A is common with that of the thermal print head 100.

In the thermal print head 100A, the second bonding pad 32*bb* and the fourth bonding pad 32*bd* are disposed in opposite in the first direction DR1, and the lead wiring portion 32*c* connected to the third bonding pad 32*c* passes through between the second bonding pad 32*bb* and the fourth bonding pad 32*bd*. Thus, in the thermal print head 100A, if the pitch of the bonding pad 32*b* is narrowed (that is, the pitch P is reduced), a width of the lead wiring portion 32*c* is inevitably reduced.

As described above, the wiring layer 30 is formed by performing wet etching on the metal layer 33 in the metal layer patterning step S4. Because the wet etching is performed isotropically, the lead wiring portion 32*c* is thinned if the width of the lead wiring portion 32*c* is reduced, such that the lead wiring portion 32*c* can break sometimes. Thus, it is difficult to reduce the pitch P according to the thermal print head 100A.

On the other hand, in the thermal print head 100, the lead wiring portion 32*c* connected to the second bonding pad 32*bb* of the first group GP passes through between the first bonding pad 32*ba* of the first group GP1 and the third bonding pad 32*bc* of the first group GP1, and the lead wiring portion 32*c* connected to the fourth bonding pad 32*bd* of the first group GP1 passes through between the third bonding pad 32*bc* of the first group GP1 and the first bonding pad 32*ba* of the second group GP2.

However, in the thermal print head 100, the first bonding pad 32*ba* of the first group GP1 and the third bonding pad 32*bc* of the first group GP1 are not disposed in opposite in the first direction DR1, and the third bonding pad 32*bc* of the first group GP1 and the first bonding pad 32*ba* of the second group GP2 are not disposed in opposite in the first direction DR1. Thus, in the thermal print head 100, the lead wiring portion 32*c* does not pass through between two bonding pads 32*b* disposed in opposite in the first direction DR1, and so the width of the lead wiring portion 32*c* can be ensured even if the pitch P is reduced. For example, in the thermal print head 100, the lead wiring portion 32*c* can be extended to regions indicated by the dotted lines in FIG. 5. As a result, according to the thermal print head 100, even if the pitch P is reduced, the lead wiring portion 32*c* is not easily broken during wet etching, and the pitch between the bonding pads 32*b* can be narrowed (for example, the pitch P can be set to less than about 70 μm).

The number of bits of outputs of current driver ICs is mostly a multiple of 4 (64-bit, or 128-bit). In the thermal print head, since four bonding pads 32*b* are arranged as one cycle, current driver ICs can be easily handled.

When the wiring layer 30 is formed of silver, compared to when the wiring layer 30 is formed of gold, the thickness T is sometimes increased. When the thickness T is increased, the amount of etching in a horizontal direction (a direction perpendicular to a thickness direction of the metal layer 33) in wet etching in the metal layer patterning step S4 is increased, and the lead wiring portion 32*c* can be thinned easily. In the thermal print head 100, because the width of the lead wiring portion 32*c* can be ensured, narrowing of the pitch between the bonding pads 32*b* can be achieved even if the thickness T is increased. Moreover, by forming the wiring layer 30 by silver, compared to when the wiring layer 30 is formed of gold, manufacturing costs of the thermal print head 100 can be reduced.

Variation Examples

In the description above, although an example in which four bonding pads 32*b* are used as a group and such group is periodically arranged along the first direction DR1, and the plurality of bonding pads 32*b* are arranged into three rows along the first direction DR1, the arrangement of the plurality of bonding pads 32*b* is not limited such example. If the lead wiring portion 32*c* does not pass through between two bonding pads 32*b* disposed in opposite in the first direction DR1, a group including five or more bonding pads 32*b* can also be arranged periodically along the first direction, and the plurality of bonding pads 32*b* can also be arranged in four or more rows along the first direction DR1. However, as shown in the example in FIG. 1 to FIG. 5, by arranging the plurality of bonding pads 32*b* in three rows along the first direction DR1, an increase in a size of the thermal print head 100 in the second direction DR2 can be suppressed.

Notes

The embodiments include the following configurations.

Note 1

A thermal print head, comprising:

a substrate;

a glaze layer, disposed on the substrate; and a wiring layer, disposed on the glaze layer, wherein the wiring layer includes a plurality of bonding pads, the plurality of bonding pads are divided into a plurality of groups, each of the plurality of groups includes a first bonding pad, a second bonding pad, a third bonding pad and a fourth bonding pad, a first group of the plurality of groups is adjacent to a second group of the plurality of groups along a first direction, the second bonding pad of the first group is located between a center of the first bonding pad of the first group and a center of the third bonding pad of the first group along the first direction, the fourth bonding pad of the first group is located between the center of the third bonding pad of the first group and a center of the first bonding pad of the second group along the first direction, and the third bonding pad is disposed between the first bonding pad, the second bonding pad, and the fourth bonding pad along a second direction perpendicular to the first direction.

Note 2

The thermal print head according to note 1, wherein a thickness of the wiring layer is between about 3 μm and about 10 μm.

Note 3

The thermal print head according to note 1 or 2, wherein a pitch between two adjacent bonding pads of the plurality of bonding pads along the first direction is between about 30 μm and about 70 μm.

Note 4

The thermal print head according any one of notes 1 to 3, wherein a material of the wiring layer comprises silver.

Embodiments of the disclosure are as described above; however, various modification may be made to the embodiments. Moreover, the disclosure is not limited to the embodiments described above. The scope of the present disclosure is represented by way of the claims, and is intended to cover all equivalent meanings and variations made within the scope accorded with the claims.

The invention claimed is:

1. A thermal print head, comprising:
a substrate;
a glaze layer, disposed on the substrate; and
a wiring layer, disposed on the glaze layer, wherein
the wiring layer includes a plurality of bonding pads,
the plurality of bonding pads are divided into a plurality of groups,
each of the plurality of groups includes a first bonding pad, a second bonding pad, a third bonding pad and a fourth bonding pad,
a first group of the plurality of groups is adjacent to a second group of the plurality of groups along a first direction,
the second bonding pad of the first group is located between a center of the first bonding pad of the first group and a center of the third bonding pad of the first group along the first direction,
the fourth bonding pad of the first group is located between the center of the third bonding pad of the first group and a center of the first bonding pad of the second group along the first direction,
the third bonding pad of one of the plurality of groups is disposed between the first bonding pad, the second bonding pad, and the fourth bonding pad of the one of the plurality of groups along a second direction perpendicular to the first direction, and the first bonding pads of the plurality of groups are arranged to form a first row along the first direction,
the third bonding pads of the plurality of groups are arranged to form a second row along the first direction, and
the second bonding pads and the fourth bonding pads of the plurality of groups are arranged to form a third row along the first direction,
wherein further the first row, the second row, and the third row are arranged on positions shifted from one another in the second direction.

2. The thermal print head of claim 1, wherein a thickness of the wiring layer is between about 3 μm and about 10 μm.

3. The thermal print head of claim 2, wherein a material of the wiring layer comprises silver.

4. The thermal print head of claim 1, wherein a pitch between two adjacent bonding pads of the plurality of bonding pads along the first direction is between about 30 μm and about 70 μm.

5. The thermal print head of claim 4, wherein a material of the wiring layer comprises silver.

6. The thermal print head of claim 1, wherein a material of the wiring layer comprises silver.

7. A thermal print head, comprising:
a substrate;
a glaze layer, disposed on the substrate; and
a wiring layer, disposed on the glaze layer, wherein the wiring layer includes bonding pads that are divided into groups, each of the groups includes a first bonding pad, a second bonding pad, a third bonding pad, and a fourth bonding pad, wherein
wherein a first group of the groups is adjacent to a second group of the groups along a first direction;
the second bonding pad of the first group is located between a center of the first bonding pad of the first group and a center of the third bonding pad of the first group along the first direction;
the fourth bonding pad of the first group is located between the center of the third bonding pad of the first group and a center of the first bonding pad of the second group along the first direction;
the third bonding pad of one of the groups is disposed between the first bonding pad, the second bonding pad, and the fourth bonding pad of the same group along a second direction perpendicular to the first direction;
the first bonding pads of the groups are arranged to form a first row along the first direction,
the third bonding pads of the groups are arranged in a position of a second row along the first direction, and
the second bonding pads of the groups are arranged to form a third row along the first direction,
wherein further the first row, the second row, and the third row are offset from one another in the second direction.

* * * * *